United States Patent [19]

Nielson et al.

[11] Patent Number: 5,515,255
[45] Date of Patent: May 7, 1996

[54] LAMP REFLECTOR

[75] Inventors: Wayne G. Nielson, Hutchinson; Robert D. Kruger, Howard Lake; Noah N. Rockey, Minneapolis; Michael R. Specken, Winsted; Gary V. Briesemeister, Howard Lake; John B. Grunloh, Lester Prairie, all of Minn.

[73] Assignee: Sterner Lighting Systems Incorporated, Winsted, Minn.

[21] Appl. No.: 339,596

[22] Filed: Nov. 14, 1994

[51] Int. Cl.$^6$ .................................................... F21V 7/00
[52] U.S. Cl. ........................ 362/297; 362/285; 362/346; 362/396; 362/418
[58] Field of Search ............................... 362/285, 287, 362/297, 346, 396, 419, 418, 427; 359/868, 869, 367

[56]          References Cited

U.S. PATENT DOCUMENTS

| | | | |
|---|---|---|---|
| 4,135,228 | 1/1979 | Lones | 362/297 |
| 4,229,782 | 10/1980 | Ruud et al. | 362/297 |
| 4,386,824 | 6/1983 | Draper | 350/296 |
| 4,772,988 | 9/1988 | Brun | 362/61 |
| 4,942,507 | 6/1990 | Wagener | 362/296 |
| 4,954,938 | 9/1990 | Lyons | 362/298 |
| 4,992,911 | 2/1991 | Ressia | 362/61 |
| 5,023,755 | 6/1991 | Rosenberg | 362/287 |
| 5,045,982 | 9/1991 | Lyons | 362/241 |
| 5,047,902 | 9/1991 | Neumann et al. | 362/61 |
| 5,086,376 | 2/1992 | Blusseau | 362/61 |
| 5,136,491 | 8/1992 | Kano | 362/346 |

*Primary Examiner*—Carroll R. Dority
*Attorney, Agent, or Firm*—Westman, Champlin & Kelly

[57]                ABSTRACT

A light fixture includes a lamp mounted within a reflector. The reflector includes a first surface lying in a generally parabolic sheet and being bounded in the generally parabolic sheet by first and second edges. A pair of generally opposing surfaces are connected to the first surface at the first and second edges. The generally opposing surfaces have a shape such that the lamp provides a generally rectangular beam pattern when the reflector reflects or redirects light from the lamp.

31 Claims, 7 Drawing Sheets

LAMP REFLECTOR

The following U.S. Patents are hereby incorporated by reference: U.S. Pat. No. 5,111,371 entitled ARC STREAM CORRECTING LAMP HOLDER issued May 5, 1992; and U.S. Pat. No. 4,513,359 entitled LAMP STABILIZER issued Apr. 23, 1985.

BACKGROUND OF THE INVENTION

The present invention relates to a light fixture. More specifically, the present invention relates to a light fixture having a reflector configuration for providing a desired beam pattern.

Lighting devices, with incandescent or arc discharge lamps, have been provided with reflectors for many years. The reflectors typically reside behind the lamp and reflect or redirect light or other radiation produced by the lamp in a desired direction. It is often desired to have an electromagnetic radiation source (a lamp) that radiates the electromagnetic radiation in the visible spectrum (light) on a particular area. Such applications include sports stadiums, sports arenas, and other commercial and industrial applications.

In many applications, the electromagnetic radiation is derived from a plasma arc formed within an electromagnetic transmissive envelope or arc tube. One form of such an arc discharge lamp is a metal halide lamp. In such lamps, the arc is ignited between two electrodes placed at opposite ends of the electromagnetic transmissive envelope. These electrodes define an envelope axis and are connected to a power supply which supplies the proper voltage and current for starting and operating the lamp.

Prior arc discharge lamps also included a reflecting surface, such as a single parabolic sheet reflecting surface bounded by opposing planar surfaces. The reflecting surface had a predetermined focal axis. Such a parabolic sheet reflector surface results in a beam pattern reflected on the desired area which is typically longer along a horizontal axis than along a vertical axis. The beam pattern provides lower intensity light at the outer ends of the horizontal axis.

Arc discharge lamps have also been provided with reflectors of other shapes, such as elliptic or parabolic shapes. However, such reflectors commonly result in a circular beam pattern. This can result in certain inefficiencies where desired lighting effects are sought.

In certain lighting venues, such as arenas or stadiums, it is desirable to have the entire lighted surface uniformly illuminated. In using prior parabolic sheet-type reflectors, or elliptical or paraboloid-type reflectors, the beam patterns needed to be significantly overlapped in order to illuminate the entire lighted surface. For example, with a parabolic sheet-type reflector, the illumination at the horizontal extremes of the beam pattern were required to be overlapped. This resulted in unwanted fringing effects in overlapped regions of the beam patterns of two or more lamps. In addition, with elliptic or paraboloid-type reflectors, the resultant round beam pattern made it very difficult to uniformly illuminate a surface. Round beam patterns were difficult to fit together and therefore needed to overlap one another resulting in bright and dim spots on the illuminated surface.

Another problem encountered in attempting to provide lighting for arenas is that the lighting systems are typically mounted to catwalks which are hung high above the arena floor. The catwalks are typically metal catwalks with pipe railings. Typical catwalks have either two or three railings, and the spacing between the railings differs widely from arena to arena and catwalk to catwalk. Therefore, mounting devices for mounting light fixtures to the railings on the catwalks have, to date, been specifically custom designed for each arena, based on rail spacing of the catwalks from which the lighting fixtures are to be hung. Such custom design is expensive and inefficient.

SUMMARY OF THE INVENTION

The present invention arises in part from the realization that, if one were to obtain a tight rectangular beam pattern from a reflector, the resultant beam patterns could be easily fit together when illuminating a surface such as a stadium or arena floor and would provide consistent uniform lighting on the desired surface.

Thus, the present invention includes a reflector and a lamp (preferably an arc discharge-type lamp) mounted within the reflector. The reflector includes a first surface lying in a generally parabolic sheet and bounded in the generally parabolic sheet by first and second edges. The first surface includes a central portion and first and second end portions wherein the first and second end portions have a first width in the parabolic sheet and the central portion has a second width in the parabolic sheet. The second width is smaller than the first width. A pair of generally opposing surfaces are connected to the first surface at the first and second edges and have a shape such that the lamp provides a generally tight rectangular beam pattern when the reflector reflects radiation from the lamp.

Another feature of the present invention includes an adaptable mounting bracket for mounting light fixtures to railings having different spacings.

DETAILED DESCRIPTION OF THE PREFERRED EMBODIMENTS

Figure 1:
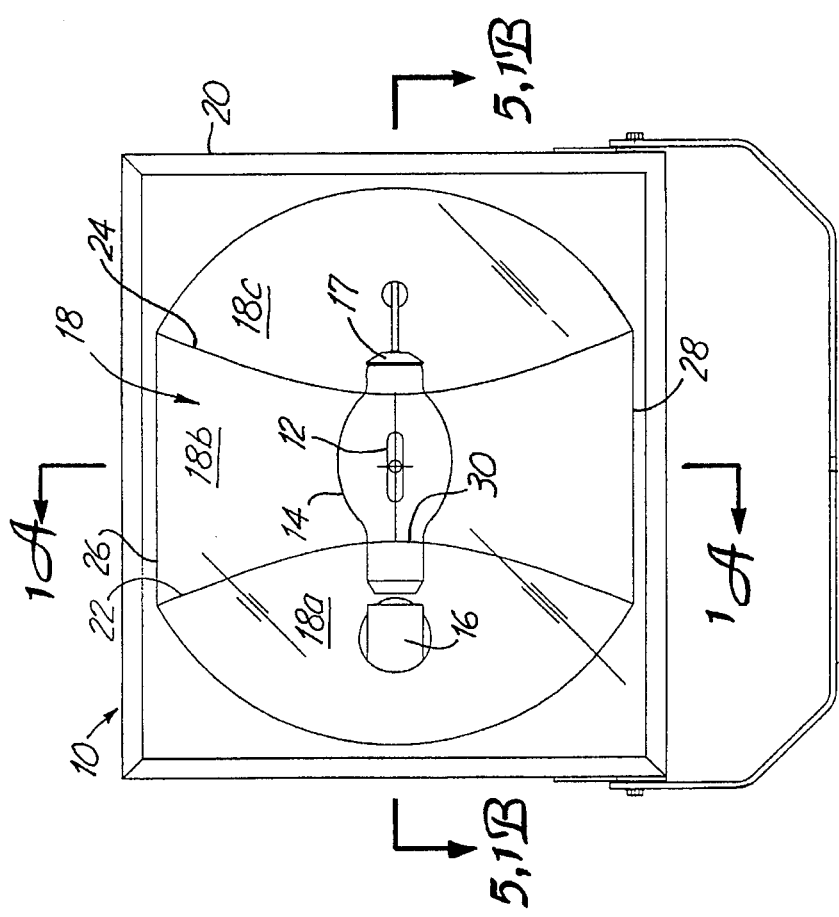
FIG. 1 is a front view of a lamp and reflector formed according to the present invention.

FIG. 1 is a front view of light fixture 10 according to the present invention. Light fixture 10 includes electromagnetic radiation enclosure 12, electromagnetic transmissive envelope 14, first and second receiving assemblies 16 and 17, reflector 18 and housing 20.

Electromagnetic radiation is emitted from radiating enclosure 12 within envelope 14. Reflector 18 reflects or redirects at least a portion of the electromagnetic energy from envelope 14 in a preselected direction.

Electromagnetic radiating enclosure 12 may typically include a lamp emitting electromagnetic radiation in both the visible and non-visible spectra. An example of a device which is preferably used with reflector 18 of the present invention is a metal halide arc lamp.

Reflector 18 includes three surfaces 18a, 18b, and 18c. In the preferred embodiment, surfaces 18a and 18c are sections of a paraboloid, and are substantially mirror images of one another. Surface 18b is a portion of a parabolic sheet defined by edges 22 and 24. Surface 18b is connected to surface 18a at edge 22 and is connected to surface 18c at edge 24. Surface 18b has a first end 26, a second end 28 and a central, or vertex, portion 30. The width of surface 18b in the parabolic sheet is defined by edges 22 and 24. The width of ends 26 and 28 is substantially equal, and is greater than the width of central or vertex portion 30.

Figure 1A:
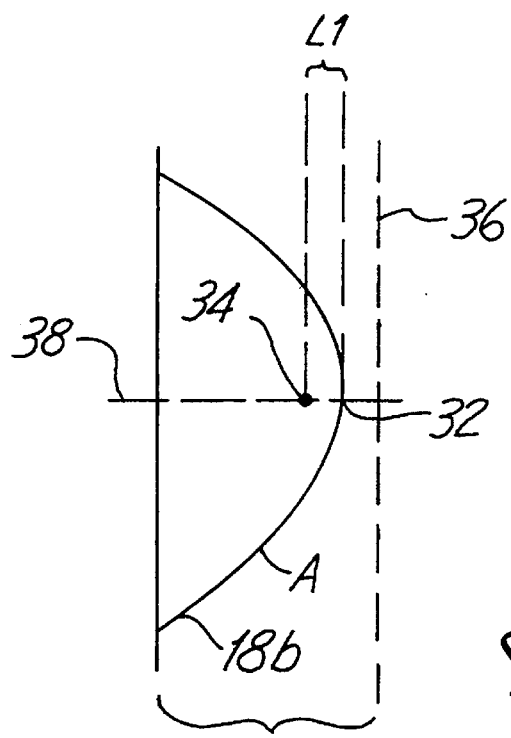
FIG. 1A is a side section view taken along section lines 1A—1A in FIG. 1.

FIG. 1A shows a section view of reflector 18 taken along section lines 1A—1A, with housing 20, envelope 14 and mounting assemblies 16 and 17 removed for the sake of clarity. FIG. 1A shows that the cross-section of surface 18b is substantially parabolic. A parabola (section A) defined by the cross-section of surface 18b has a vertex at point 32, a focal point at point 34, a directrix identified by dashed line 36 and an axis identified by dashed line 38. Since surface 18b is a portion of a parabolic sheet, rather than simply a parabola, focal point 34 actually represents a focal line running into and out of the page of FIG. 1A. In the preferred embodiment, the focal length of section A is represented by length L1 and is approximately 2.750 inches. In other words, focal point 34 is located 2.750 inches from vertex 32.

Figure 1B:
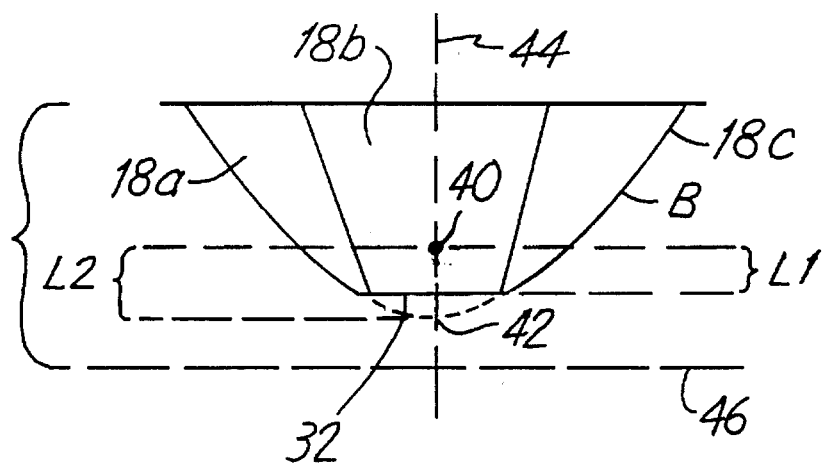
FIG. 1B is a section view taken along section lines 1B—1B in FIG. 1 with a portion of the lamp removed for clarity.

FIG. 1B illustrates the shape of surfaces 18a and 18c. FIG. 1B shows that the surfaces 18a and 18c are portions of a parabola (section B) defined by the section of reflector 18 taken along section lines 1B—1B in FIG. 1. In essence, surfaces 18a and 18c are portions of a paraboloid formed by revolving section B around axis 44. The parabola forming section B has a focal point 40, a vertex 42, an axis 44 and a directrix 46. Section B has a focal length L2 which is approximately 3.375 inches. In other words, focal point 40 lies 3.375 inches from vertex 42. However, section 18b is essentially laid inside the paraboloid defining sections 18a and 18c and is displaced above vertex 42 such that focal point 40 coincides with focal point 34. That is, focal point 40 is displaced from vertex 32 by a distance L1. Thus, even though the parabolas defined by sections A and B have different focal lengths L1 and L2, the sections A and B are arranged to have a common focal point.

By providing the three surfaces 18a, 18b and 18c, having different focal lengths but a common focal point, reflector 18 provides a beam pattern when reflecting or redirecting radiation from envelope 22 which is a tight, rectangular beam pattern suitable for fitting with adjacent beam patterns to evenly illuminate a desired surface such as an arena or stadium floor.

Figure 2:
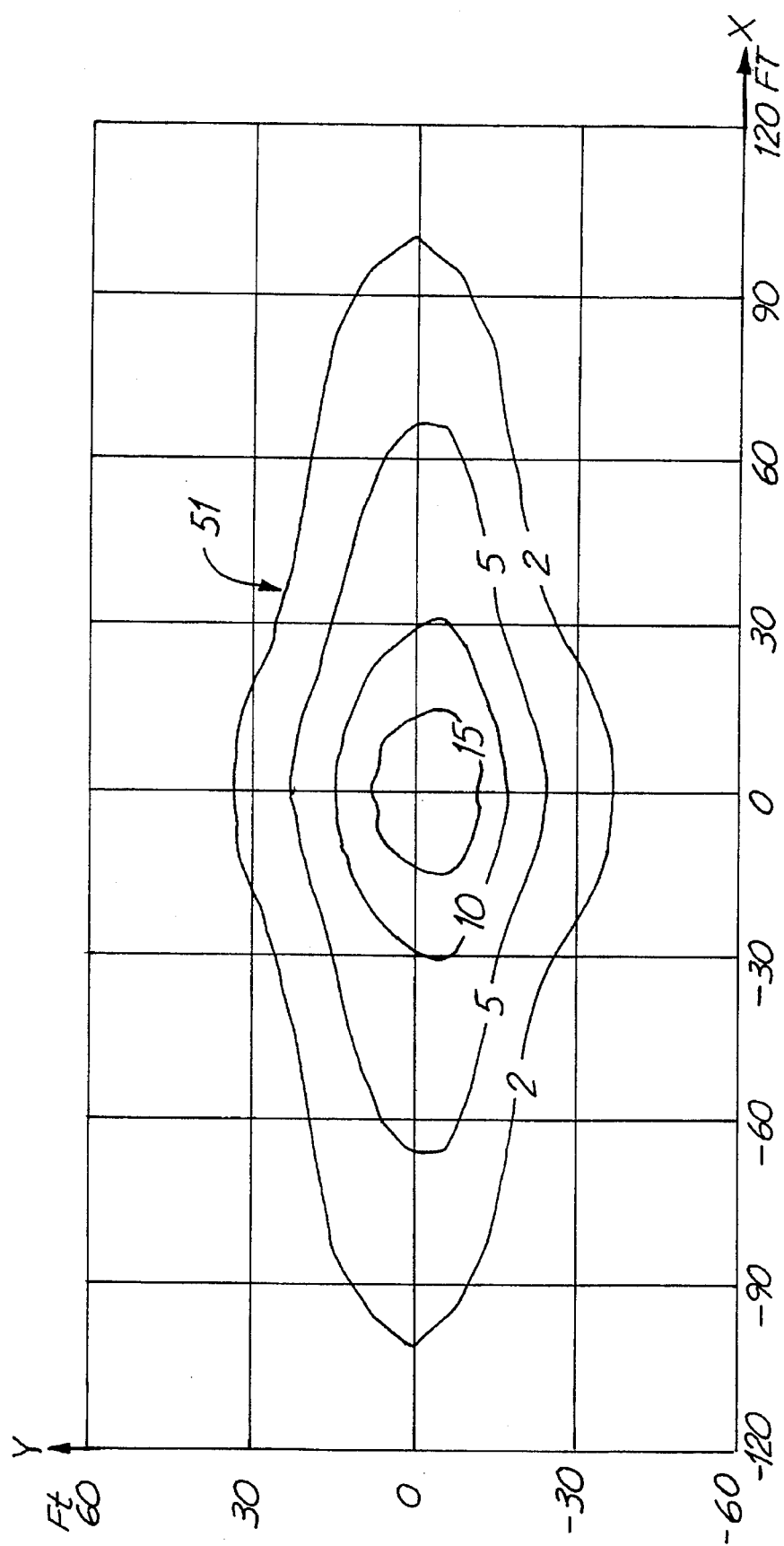
FIG. 2 is a footcandle plot of the beam pattern produced by the lamp and reflector shown in FIG. 1.

FIG. 2 is a footcandle plot showing footcandle traces on an illuminated area 51 which is separated into an X-Y coordinate grid. The plot shows lines corresponding to two (2) footcandles, five (5) footcandles, ten (10) footcandles and fifteen (15) footcandles. FIG. 2 shows that the beam pattern generated by reflector 18 is substantially rectangular, particularly in the area illuminated by the higher intensity radiation, such as in the 10–15 footcandle area. The radiation reflected drops off significantly faster along the horizontal axis than in previous reflector arrangements. This provides a tight, essentially rectangular pattern, which can be easily fit with adjoining beam patterns to uniformly, and continuously, illuminate a desired surface. The present reflector 18 generates a beam pattern which significantly reduces the unwanted fringe affects of beam patterns produced by prior reflectors.

Figure 3:
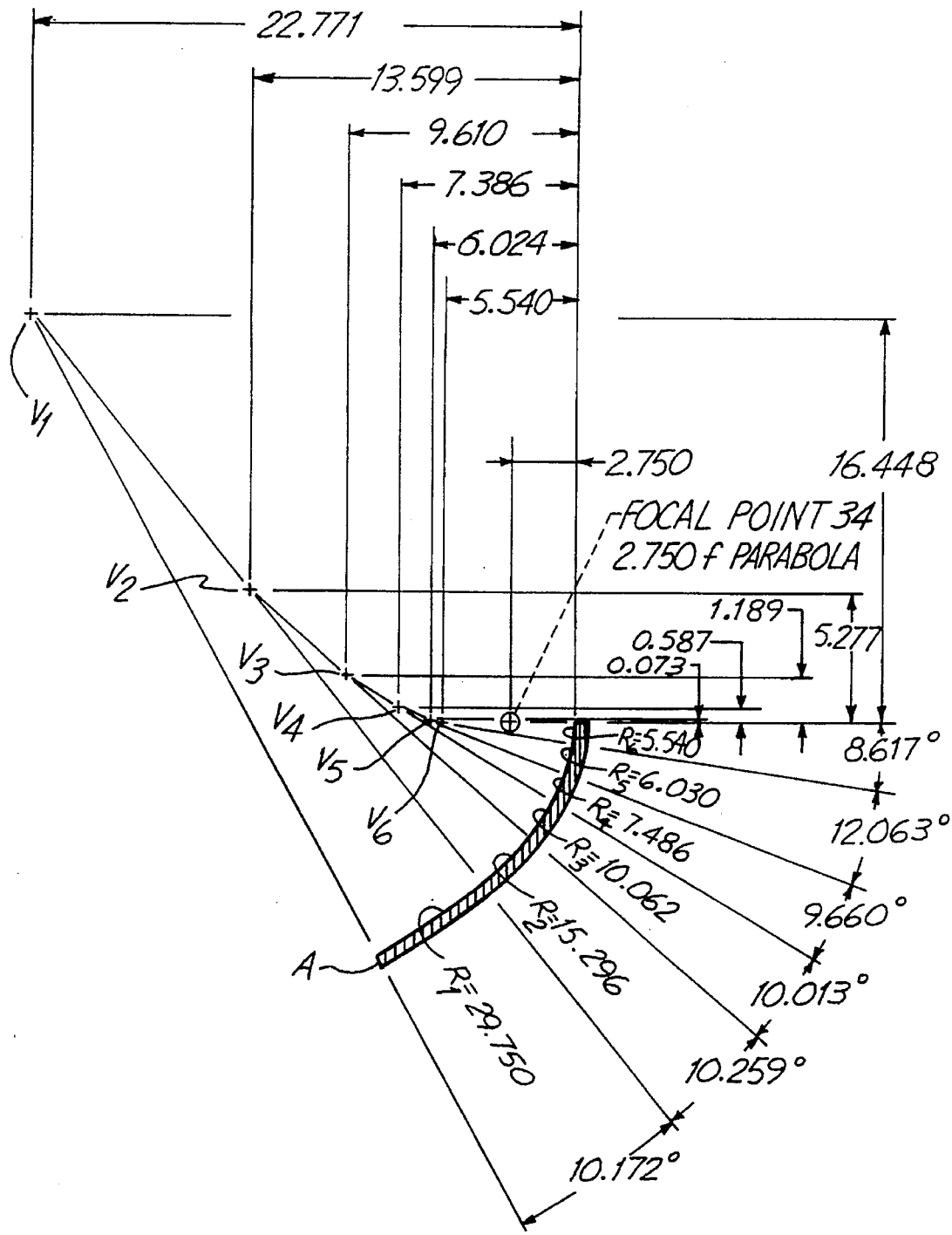
FIG. 3 is a detailed diagram showing a contour of a portion of the reflector shown in FIGS. 1–2.

FIG. 3 shows a detailed view of section A of the paraboloid shown in FIG. 1A which lies along the parabolic sheet forming surface 18b. In the preferred embodiment, reflector 18 is machine formed. Machines conventionally have difficulty following a true parabolic curve. Thus, the parabolic curve is estimated by programming the machine to move through a plurality of arcs measured at a plurality of different radii $R_1$–$R_6$. While the resultant shape is actually a cycloid shape, it closely conforms to the desired parabola.

In the preferred embodiment shown in FIG. 3 the illustrated half of section A is made by forming the surface about six different arcs measured at six different radii $R_1$–$R_6$. For example, the first portion of section A is preferably formed along an arc of 10.172° about a vertex $V_1$ measured at a radius of 29.750 inches. The second portion forming section A is formed about vertex $V_2$ along an arc of 10.259° with a radius of 15.296 inches. The forming process is continued through all six arcs about all six vertices $V_1$–$V_6$ measured with six different radii identified as $R_1$–$R_6$. The resultant surface forms or approximates a parabola having a focal point located 2.750 inches from the vertex or base of the parabola. The appropriate measurements for locating vertices $V_1$–$V_6$ relative to section A are also shown in FIG. 3.

Figure 4:
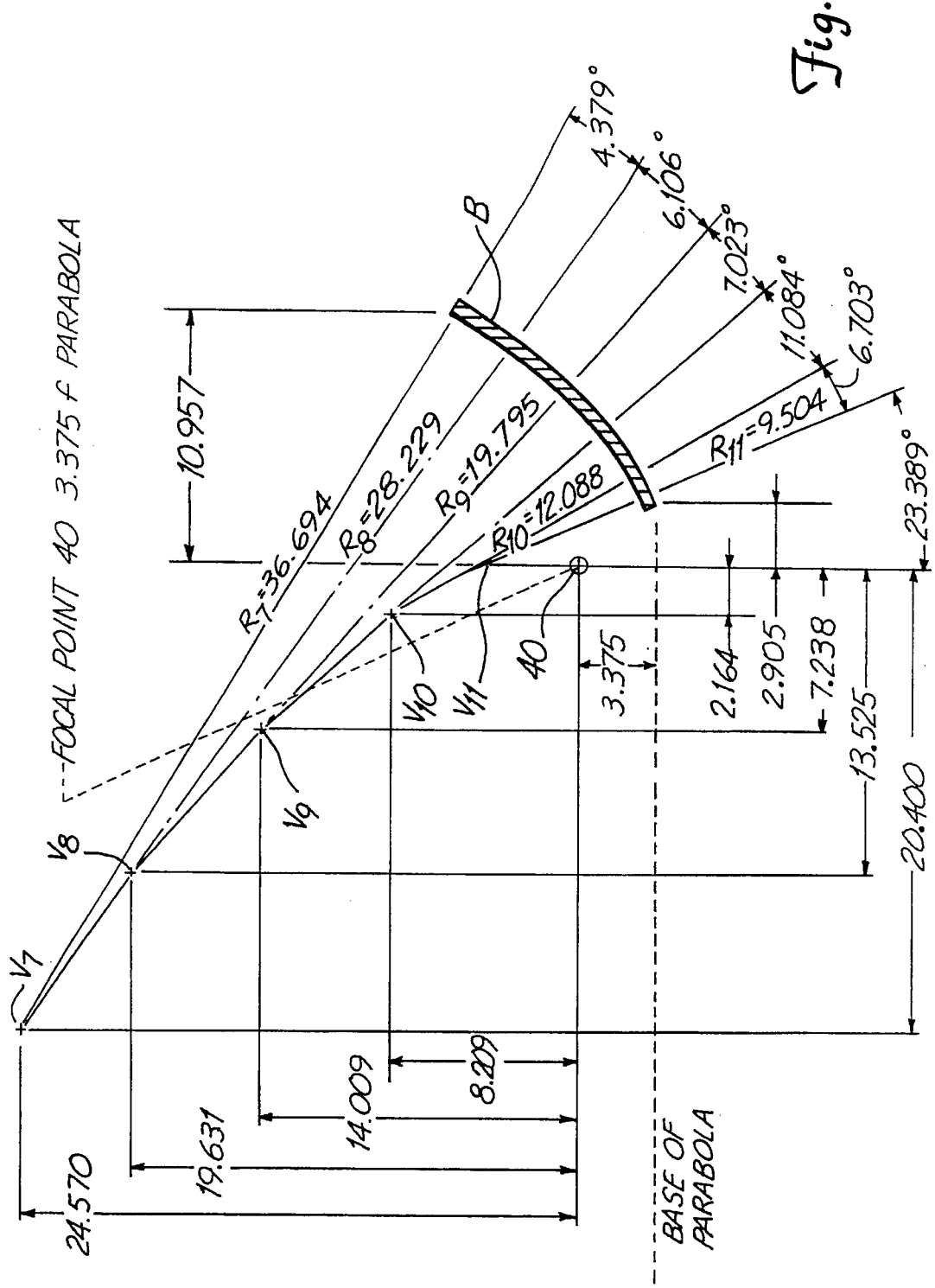
FIG. 4 is a detailed diagram showing a contour of a portion of the reflector shown in FIGS. 1–2.

FIG. 4 shows a part of section B of the parabola shown in FIG. 1B which defines a portion of the paraboloid forming surfaces 18a and 18c. The portion of section B shown in FIG. 4 is formed along five different arcs measured at five different radii $R_7$–$R_{11}$. The radii are measured from different vertices $V_7$–$V_{11}$. The degrees through each arc are shown on FIG. 4 along with the measurements of the radii $R_7$–$R_{11}$. FIG. 4 also shows the preferred location of vertices $V_7$–$V_{11}$ relative to section B. In the embodiment shown in FIG. 4, the resultant parabola containing section B has a focal point 40 located 3.375 inches from the base of the parabola.

Again, as with section A shown in FIG. 3, section B is actually cycloid in shape. However, it closely approximates the parabola having the desired focal point and axis.

Figure 6:
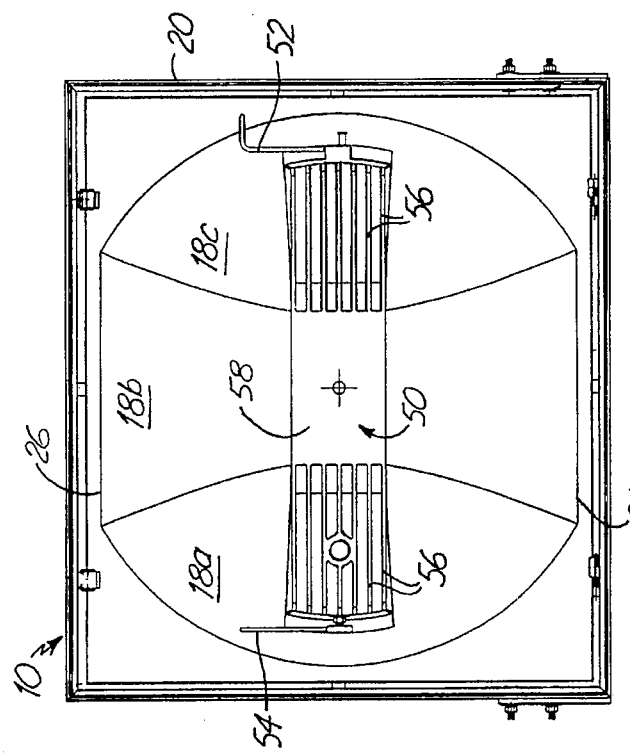
FIG. 6 is a rear view of the lamp and reflector shown in FIG. 1.
Figure 5:
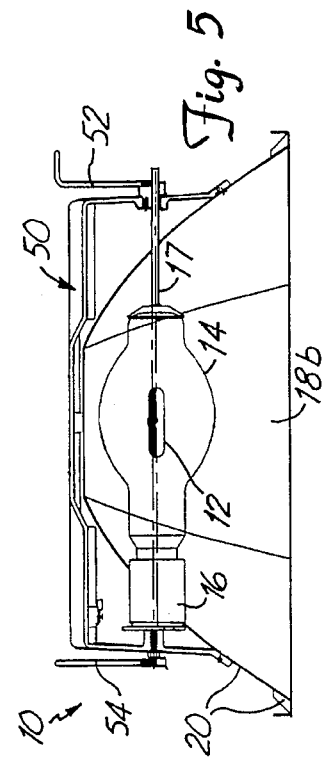
FIG. 5 is a top view of the lamp and reflector shown in FIG. 1 taken along section line 5—5.

FIGS. 5 and 6 are views of light fixture 10 taken along section line 5—5, and from the rear of lamp 10, respectively. FIGS. 5 and 6 show heat sink 50 coupled to mounting assemblies 16 and 17. The detailed operation of heat sink 50 and mounting assemblies 16 and 17 is described in greater detail in U.S. Pat. Nos. 5,111,371 and 4,513,359 which are hereby incorporated by reference. Briefly, radiating enclosure 12 is preferably located on focal points 34 and 40 for most desirable lighting affects. However, the arc generated by radiating enclosure 12, at certain times, is not linear, but rather bends spatially. Thus, when trying to locate the arc along the focal line defined by surface 18b, the arc must be repositioned. In the embodiment shown in FIGS. 5 and 6, mounting assemblies 16 and 17 have a rotatable member therein which is coupled to levers 52 and 54. By rotating levers 52 and 54 in a desired direction, the arc generated in radiating enclosure 12 can be moved back into alignment with the focal line defined by surface 18b. Hence, rotation of levers 52 and 54 allows determinable upward arc movement or displacement to be compensated in a preselected direction. This provides for greater control of redirected light from reflector 18.

In addition, FIGS. 5 and 6 show heat sink 50. Heat sink 50 is formed of a plurality of fins 56 joined by a central portion 58. Fins 56, and central portion 58, are preferably formed of highly conductive material which conducts heat from reflector 18 to the ambient air surrounding heat sink 50.

It should be noted that surfaces 18a, 18b and 18c are all preferably integrally formed with one another through a suitable machining or stamping process. However, surfaces 18a, 18b and 18c can also be formed separately and joined using any suitable process.

Figure 7B:
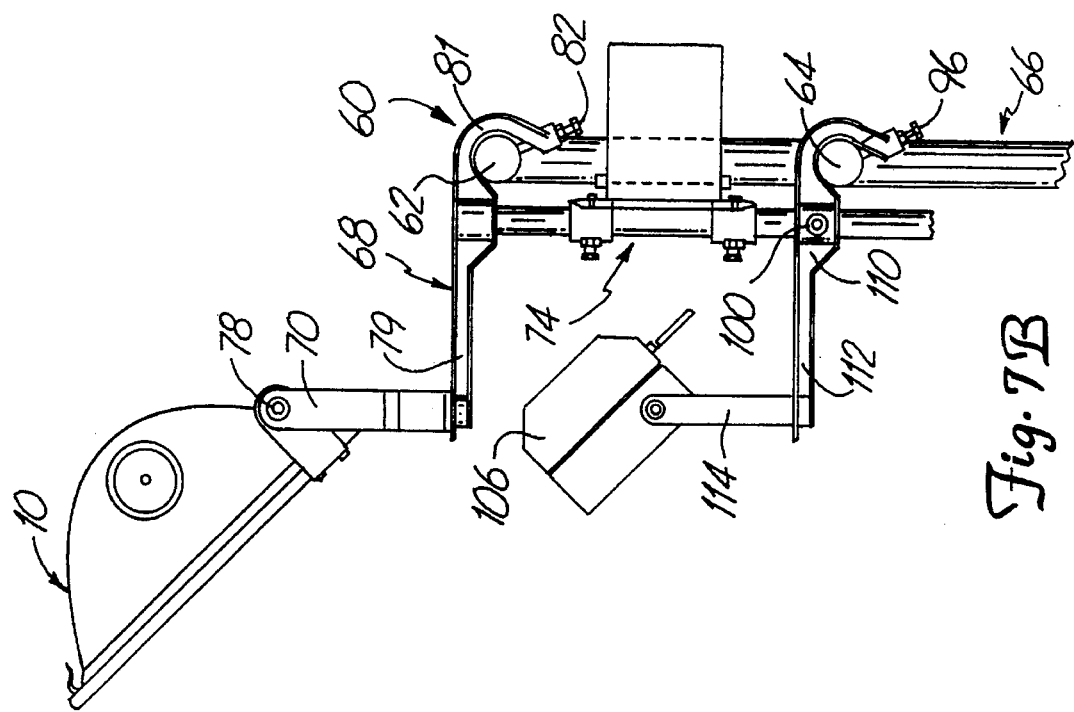
FIGS. 7A, 7B and 7C show three embodiments of a mounting bracket according to the present invention.
Figure 7A:
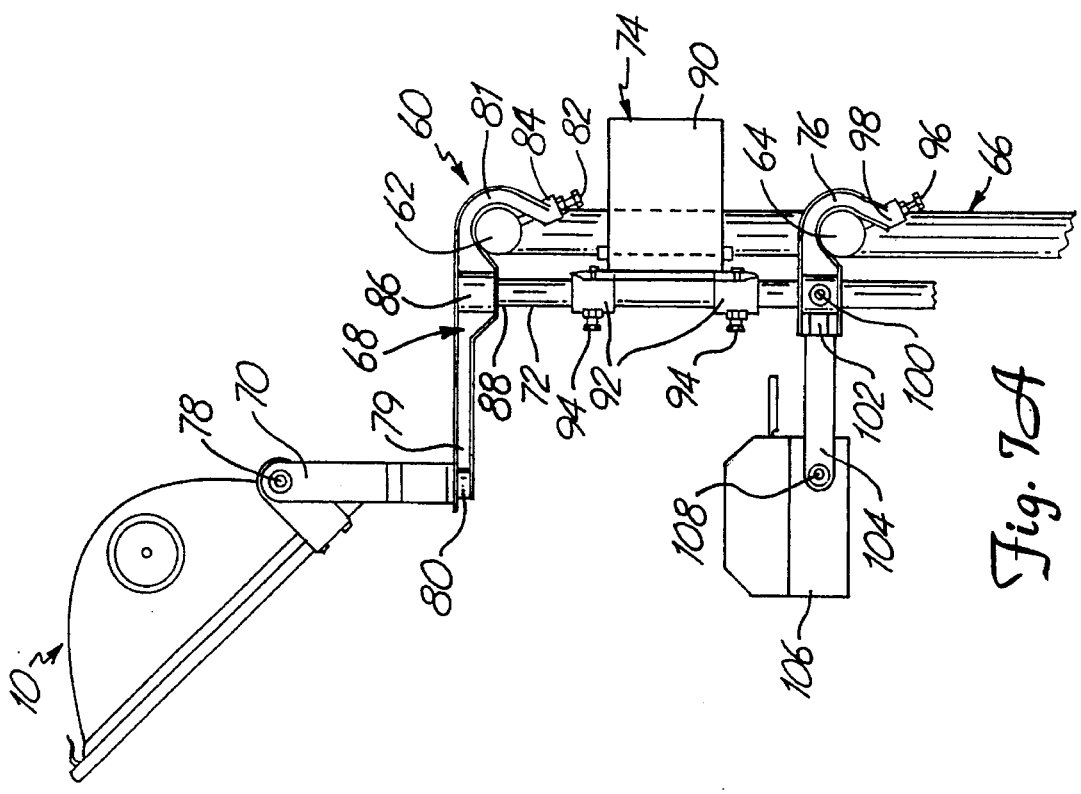
Figure 7C:
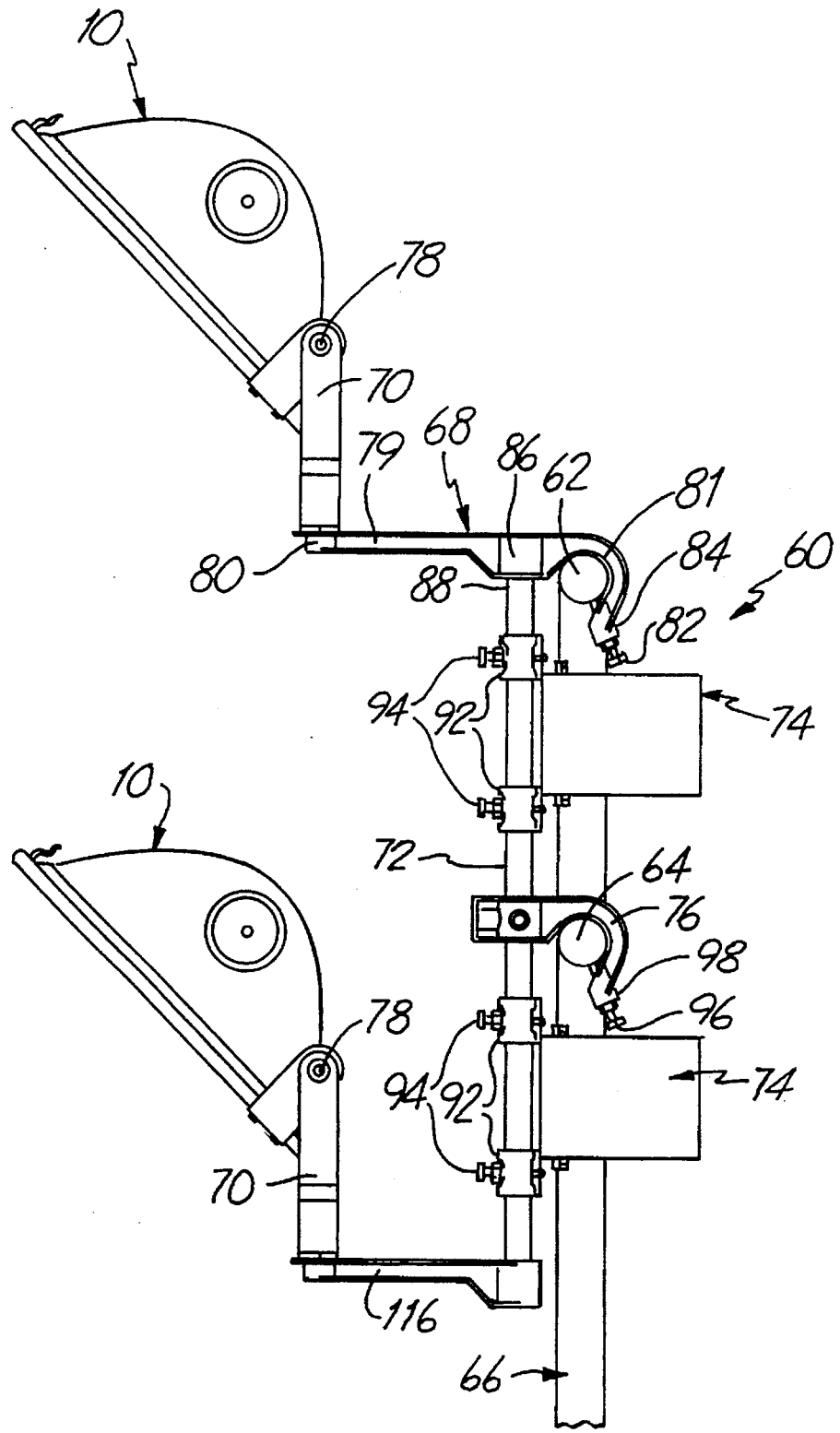

FIGS. 7A, 7B and 7C show light fixture 10 mounted according to one aspect of the present invention. In arena lighting projects, it is very common that arena lights are mounted from railings of a catwalk which is located near the roof of the arena. Such catwalks almost uniformly have pipe railings to which the light fixture must be mounted. However, the pipe railings on the catwalk often have different vertical spacings from arena to arena. Therefore, until now, mounting light fixtures in different arenas has required custom designed mounting brackets, designed to fit the spacing of each particular railing design for the catwalks in the particular arenas.

One feature of the present invention provides mounting assembly 60, shown in FIGS. 7A, 7B and 7C, for mounting light fixture 10 to railings 62 and 64 of a catwalk 66.

In FIG. 7A, mounting bracket assembly 60 includes hook and arm member 68, upright support 70, slide rail 72, ballast assembly 74, and hook member 76. Light fixture 10 is pivotally coupled at point 78 to a pair of upright supports 70 (only one of which is shown in FIG. 7A). Hook and arm member 68 has an arm portion 79 and a hook portion 81. Upright supports 70 are rigidly coupled to an extreme end portion 80 of arm 79.

Hook portion 81 has a curved inner surface which curves about upper railing 62. In most arenas, catwalks 66 are provided with at least two, and sometimes three, pipe railings formed of pipe which is approximately 1.900–2.375 inches in diameter. The inner surface of hook portion 81 is sized to fit about both of these diameters. Hook portion 81 is provided with a set screw 82 which threadably mates with a socket 84. Once hook portion 81 is located about railing pipe 62, set screw 82 is tightened on railing 62 to rigidly connect hook portion 81 to railing 62.

Between arm portions 79 and hook portion 81, arm and hook member 68 is provided with a threaded socket or casting 86. Slide rail 72 is preferably formed of a 1.315 inch diameter pipe which has an upper end 88 which is threaded about its exterior surface. Upper end 88 of slide rail 72 is threaded into casting or socket 86 in hook and arm member 68.

Ballast box assembly 74 is a rectangular box or enclosure 90, which holds the electrical ballast (or transformer) coupled to slide rail 72 by a pair of sliding members 92. Sliding members 92 are both rigidly connected to ballast box 90 but have a bore therein which is sized just larger than the diameter of slide rail 72 to facilitate sliding of slide members 92 along slide rail 72. Slide members 92 are also each provided with set screws 94. During mounting of light fixture 10 and bracket assembly 60, ballast assembly 74 can be vertically positioned along slide rail 72 so that it fits between railings 62 and 64 and provides an enclosure on the electrical ballast for the lighting system. Once the ballast assembly 74 is properly positioned, set screws 94 are tightened down on slide rail 72 to rigidly hold ballast assembly 74 relative to slide rail 72.

Hook member 76 is similar to the hook portion 81 of hook and arm member 68. Hook member 76 has a set screw 96 threadably engaging a threaded socket 98. Set screw 96 can be tightened down on railing 64 to rigidly couple hook member 76 to railing 64. However, rather than having a threaded socket or casting 86 (as with hook and arm member 68) hook member 76 is provided with a clearance bore sized large enough to permit movement of hook member 76 along slide rail 72. Further, hook member 76 is provided with a set screw 100 which can be tightened down onto slide rail 72 to rigidly couple hook member 76 to slide rail 72.

Therefore, as the vertical spacing between railings 62 and 64 changes from arena to arena, the mounting bracket assembly 60 does not need to be redesigned or custom designed for each arena. Rather, ballast assembly 74 can be slid along slide rail 72 until it is located in a desirable position, and then rigidly attached to slide rail 72. In addition, hook member 76 can be slid along slide rail 72 until it engages lower railing 64, where it can be rigidly attached to both lower railing 64 and slide rail 72. This provides a flexible and modular mounting bracket assembly 60 which can be mounted to a wide variety of railings and catwalks.

The embodiment shown in FIG. 7A also shows that hook member 76 has mounting holes 102 which are mounted to a pair of arms 104 (only one of which is shown in FIG. 7A). Arms 104 are mounted to a second light fixture 106 which is pivotably connected to arms 104 at point 108.

FIG. 7B is similar to the embodiment shown in FIG. 7A except that, rather than having lower hook member 76, the mounting bracket assembly 60 shown in FIG. 7B includes a lower hook and arm member 110. Hook and arm member 110 operates in a similar fashion to hook member 76 except that it has an integral arm portion 112 which is rigidly coupled to an upright portion 114. The upright portion 114 is used in mounting light fixture 106.

FIG. 7C shows a bracket mounting assembly 60 similar to that shown in FIG. 7A except that, rather than having hook member 76 mount a second light fixture 106, a lower arm member 116 is provided for mounting another light fixture 10. In addition, FIG. 7C shows bracket mounting assembly 60 implemented with two ballast box assemblies 74.

Lower arm 116 is mounted to upright 70 in the same fashion as arm portion 79 as mounted to upright 70 with respect to hook and arm member 68. Arm member 116 is rigidly attached to slide rail 72. Arm 116 can be attached to slide rail 72 by a threadable connection, by a sliding arrangement provided with a set screw, or by any other suitable means. This adds to the modularity and flexibility of assembly 60.

CONCLUSION

One feature of the present invention provides a reflector 18 formed of three surfaces. Surface 18b is a portion of a parabolic sheet defined by a parabola having a first focal point or focal length. Surfaces 18a and 18c bound the first surface and are portions of a paraboloid, wherein a parabola lying in the paraboloid has a second focal length, greater than the first focal length. However, the surfaces are aligned so the respective focal points coincide. This combination of shapes, arranged in a reflector 18 as shown in the present figures, provides a tight, generally rectangular, beam pattern. Such a beam pattern provides a significant improvement in uniform, continuous lighting of a desired area, such as a multipurpose arena. The present reflector is arranged for significantly improved performance over prior beam patterns generated by prior art reflectors.

Another feature of the present invention provides an adaptable mounting assembly. The mounting assembly 60 is modular and adaptable to a wide variety of mounting arrangements. This reduces costs associated with custom designing mounting fixtures for different arenas.

Although the present invention has been described with reference to preferred embodiments, workers skilled in the art will recognize that changes may be made in form and detail without departing from the spirit and scope of the invention.

What is claimed is:

1. A lamp reflector, comprising:

a first surface lying in a generally parabolic sheet and having a central portion and first and second end portions, the first and second end portions having a first width in the parabolic sheet and the central portion having a second width in the parabolic sheet, the second width being smaller than the first width, the first surface being defined by first and second edges in the parabolic sheet, a first parabola lying in the parabolic sheet having a focal length, a focal point and an axis;

a second surface, connected to the first surface along the first edge, the second surface comprising a section of a paraboloid wherein a second parabola lying in the paraboloid has an axis generally parallel with the first parabola and has a focal length different than the focal length of the first parabola; and a third surface, connected to the first surface along the second edge, the third surface comprising a section of the paraboloid wherein the first, second and third surfaces are arranged such that the focal points of the first and second parabolas coincide.

2. The lamp reflector of claim 1 wherein the first and second parabolas have vertices and wherein the vertex of the first parabola is spaced from the vertex of the second parabola in a direction toward the focal point of the second parabola away from a directrix of the second parabola.

3. The lamp reflector of claim 2 wherein the first, second and third surfaces are arranged to produce a generally rectangular beam pattern when reflecting radiation from a lamp.

4. The lamp reflector of claim 1 wherein each of the second and third surfaces are cycloid in shape approximating the paraboloid.

5. The lamp reflector of claim 1 wherein the first surface is cycloid in shape approximating the parabolic sheet.

6. The lamp reflector of claim 1 wherein the first, second and third surfaces are formed integrally with one another.

7. A light fixture, comprising:

a reflector;

a gas discharge lamp mounted within the reflector;

wherein the reflector includes a first surface lying in a generally parabolic sheet and bounded in the generally parabolic sheet by first and second edges, the first surface having a central portion and first and second end portions, the first and second end portions having a first width in the parabolic sheet and the central portion having a second width in the parabolic sheet, the second width being smaller than the first width, the first and second widths being defined by the first and second edges in the parabolic sheet, and the reflector including a pair of generally opposing surfaces connected to the first surface at the first and second edges and having a shape such that the lamp provides a generally rectangular beam pattern when the reflector redirects radiation from the lamp;

wherein the first surface defines a focal line, wherein the gas discharge lamp is generally elongate and has a longitudinal axis, and wherein the lamp is mounted within the reflector such that the longitudinal axis of the lamp is generally parallel to the focal line defined by the first surface; and wherein the longitudinal axis of the lamp is generally located on the focal line defined by the first surface.

8. The light fixture of claim 7 wherein a first parabola lying in the parabolic sheet has an axis, a focal length, and a focal point, the focal point being on the focal line defined by the first surface.

9. The light fixture of claim 8 wherein the pair of generally opposing surfaces comprises:

a second surface, connected to the first surface along the first edge, the second surface comprising a section of a paraboloid wherein a second parabola lying in the paraboloid has an axis parallel to the axis of the first parabola and has a focal length and a focal point, the focal length of the first parabola being different from the focal length of the second parabola; and a third surface, connected to the first surface along the second edge, the third surface comprising a section of the paraboloid wherein the first, second and third surfaces are arranged such that the focal point of the first parabola lies substantially on the focal point of the second parabola.

10. The light fixture of claim 9 wherein the vertex of the second parabola is spaced from the vertex of the first parabola in a direction away from the focal point of the first parabola toward a directrix of the first parabola.

11. The light fixture of claim 9 wherein each of the second and third surfaces form a section of a cycloid.

12. The light fixture of claim 9 wherein the third surface is substantially a mirror image of the second surface.

13. The light fixture of claim 9 wherein the second and third surfaces have apertures therein for mounting the gas discharge lamp within the reflector.

14. The light fixture of claim 7 wherein the first surface and the generally opposing surfaces are formed integrally with one another.

15. A light fixture, comprising:

a lamp; and a reflector, the lamp being mounted relative to the reflector so that radiation from the lamp reflected by the reflector provides a beam pattern, the reflector comprising:

a first surface, a second surface, and a third surface, the second surface being connected to the first and third surfaces and between the first and third surfaces, the first, second and third surfaces being shaped to provide a generally rectangular beam pattern;

a support assembly coupled to the reflector; and a plurality of fasteners coupled to the support assembly, for fastening the light fixture to railings, at least one of the fasteners including means whereby it may be moved relative to another of the fasteners along the support assembly to accommodate variation in spacing between the railings.

16. The light fixture of claim 15 wherein the second surface is in a generally parabolic sheet and bounded in the generally parabolic sheet by first and second edges, and wherein the first and third surfaces are connected to the second surface at the first and second edges, a first parabola lying in the parabolic sheet having a focal length, an axis and a focal point.

17. The light fixture of claim 16 wherein the first surface is connected to the second surface along the first edge, the first surface comprising:

a section of a paraboloid wherein a parabola lying in the paraboloid has a focal point and has a focal length different from the focal length of the first parabola; and wherein the third surface is connected to the second surface along the second edge, the third surface comprising a section of the paraboloid wherein the first, second and third surfaces are arranged so that the focal points of the first and second parabolas coincide with one another.

18. The light fixture of claim 15 and further comprising:

a movable ballast box assembly; and a releasable coupling releasably connecting the ballast box assembly to the support assembly and movable relative to the fasteners, to accommodate variation in spacing between the railings.

19. The light fixture of claim 18 wherein the support assembly comprises a slide rail, and wherein one of the plurality of fasteners is slidable along the slide rail relative to the other of the plurality of fasteners.

20. The light fixture of claim 19 wherein the releasable coupling is slidable along the slide rail relative to the fasteners.

21. The light fixture of claim 20 and further comprising:

a plurality of releasable couplings; and a plurality of ballast box assemblies slidably connected to the slide rail by the plurality of releasable couplings.

22. The light fixture of claim 21 and further comprising:

a support arm, connected to the slide rail, for supporting a second lamp and a second reflector.

23. An apparatus for mounting a light fixture to a plurality of elongate members spaced from one another by a spacing, the apparatus comprising:

a support assembly coupled to the light fixture;

a first connector, coupled to the support assembly and connectable to a first of the plurality of elongate members; and a second connector, coupled to the support assembly and connectable to a second of the plurality of elongate members, the first and second connectors including means adjustably coupling such to the support assembly to accommodate for variations in the spacing between the first and second elongate members.

24. The apparatus of claim 23 and further comprising:

a ballast box assembly means adjustably connected to the support assembly so spacing between the ballast box assembly and one of the first and second connectors is adjustable to accommodate for variations in the spacing between the first and second elongate members.

25. The apparatus of claim 24 and further comprising:

mounting means, coupled to the support assembly, for mounting a second light fixture to the plurality of elongate members.

26. The apparatus of claim 24 wherein the support assembly comprises:

a slide rail connecting the first and second connectors, wherein one of the first and second connectors is slidably connected to the slide rail.

27. The apparatus of claim 26 wherein both of the first and second connectors are slidably connected to the slide rail.

28. The apparatus of claim 26 wherein the ballast box assembly is slidably connected to the slide rail.

29. The apparatus of claim 28 and further comprising:

a second ballast box assembly means slidably connected to the slide rail.

30. The apparatus of claim 26 and further comprising:

mounting means, coupled to the slide rail, for mounting a second light fixture.

31. The apparatus of claim 23 wherein the plurality of elongate members comprise railings on a catwalk, and wherein the first and second connectors are generally hook shaped members having a set screw for releasably attaching the hook shaped members to the railings.

* * * * *